(12) United States Patent
Beall et al.

(10) Patent No.: US 10,925,270 B2
(45) Date of Patent: Feb. 23, 2021

(54) SELF-TENSIONING REEL SEAT

(71) Applicant: Gargod Mfg., LLC, Kilgore, TX (US)

(72) Inventors: Jeffery D. Beall, Harleton, TX (US); Rocky J. Richardson, Henderson, TX (US); Brandon L. Richardson, Longview, TX (US)

(73) Assignee: Gargod Mfg., LLC, Kilgore, TX (US)

(*) Notice: Subject to any disclaimer, the term of this patent is extended or adjusted under 35 U.S.C. 154(b) by 89 days.

(21) Appl. No.: 15/598,397

(22) Filed: May 18, 2017

(65) Prior Publication Data
US 2017/0339934 A1 Nov. 30, 2017

Related U.S. Application Data

(60) Provisional application No. 62/341,417, filed on May 25, 2016.

(51) Int. Cl.
*A01K 87/06* (2006.01)
*F41B 5/14* (2006.01)

(52) U.S. Cl.
CPC ............ *A01K 87/06* (2013.01); *F41B 5/1488* (2013.01)

(58) Field of Classification Search
CPC ........ A01K 87/06; A01K 81/00; F41B 5/1488
USPC ........................................................... 43/22
See application file for complete search history.

(56) References Cited

U.S. PATENT DOCUMENTS

| | | | |
|---|---|---|---|
| 834,555 A | 10/1906 | Bartlett | |
| 1,902,749 A * | 3/1933 | Baird | A01K 87/06 43/22 |
| 1,980,317 A | 11/1934 | Clark et al. | |
| 2,114,107 A | 4/1938 | Holding | |
| 2,182,409 A * | 12/1939 | Richards | A01K 87/06 43/22 |
| 2,479,952 A | 8/1949 | Matson | |
| 2,487,346 A * | 11/1949 | Liberty | A01K 87/06 43/22 |
| 2,501,530 A * | 3/1950 | Marshaus | A01K 87/06 43/20 |
| 2,517,224 A | 8/1950 | Matson | |
| 3,098,313 A * | 7/1963 | Portz | A01K 87/06 43/22 |
| 3,197,908 A | 8/1965 | Hirsch | |
| 3,233,355 A * | 2/1966 | Chion | A01K 87/06 43/22 |
| 3,589,350 A | 6/1971 | Hoyt, Jr. et al. | |
| 4,702,032 A * | 10/1987 | Ohmura | A01K 87/06 43/22 |
| 5,038,510 A | 8/1991 | Duke | |

(Continued)

FOREIGN PATENT DOCUMENTS

GB 825673 * 12/1959 ............. A01K 87/06

*Primary Examiner* — Christopher D Hutchens
(74) *Attorney, Agent, or Firm* — Buss & Benefield, PLLC; Michael A. Benefield

(57) ABSTRACT

Described are self-tensioning reel seat ends for fishing reel seats. The described reel seats generally have a proximal end, a distal end, and a tensioning medium. The tensioning medium provides force between the proximal and distal ends of the reel seat end in order to securely seat a fishing reel in a reel seat by way of the tensioning provided by the tensioning medium. The described self-tensioning reel seat ends can be incorporated at one or both ends of a reel seat, and can be incorporated into fishing rods or poles, as well as in bows used for bow fishing.

13 Claims, 7 Drawing Sheets

(56) References Cited

U.S. PATENT DOCUMENTS

| | | | | |
|---|---|---|---|---|
| 5,657,741 A | * | 8/1997 | Todd | F41B 5/1426 |
| | | | | 124/89 |
| 8,635,802 B2 | | 1/2014 | Soderberg | |
| 2015/0053195 A1 | | 2/2015 | Soderberg | |
| 2015/0354915 A1 | * | 12/2015 | Woods, Jr. | F41B 5/1488 |
| | | | | 124/86 |

* cited by examiner

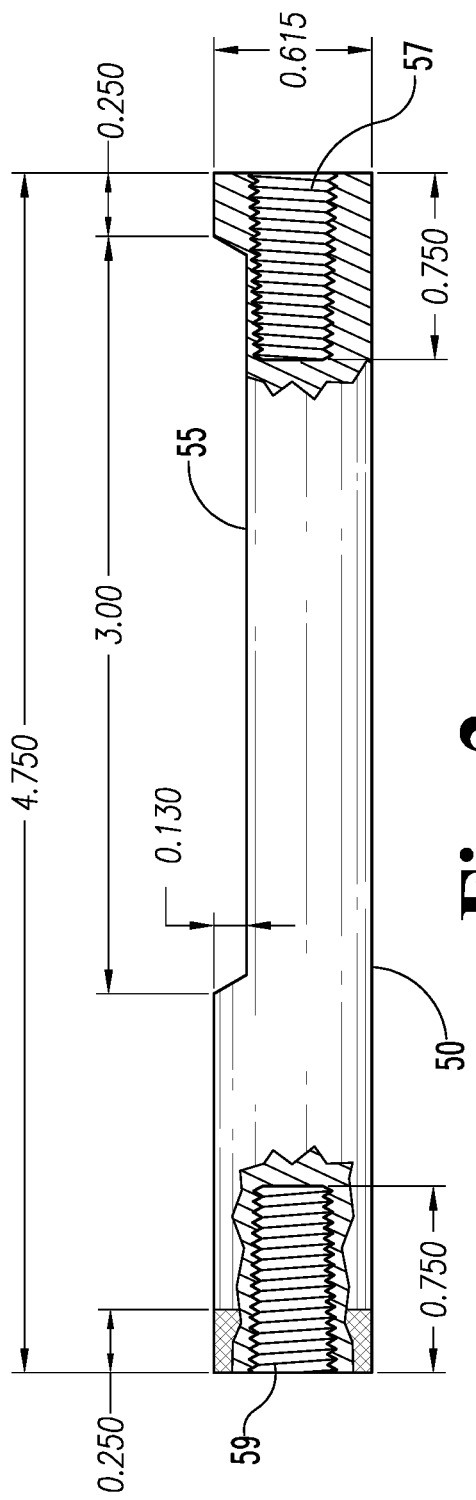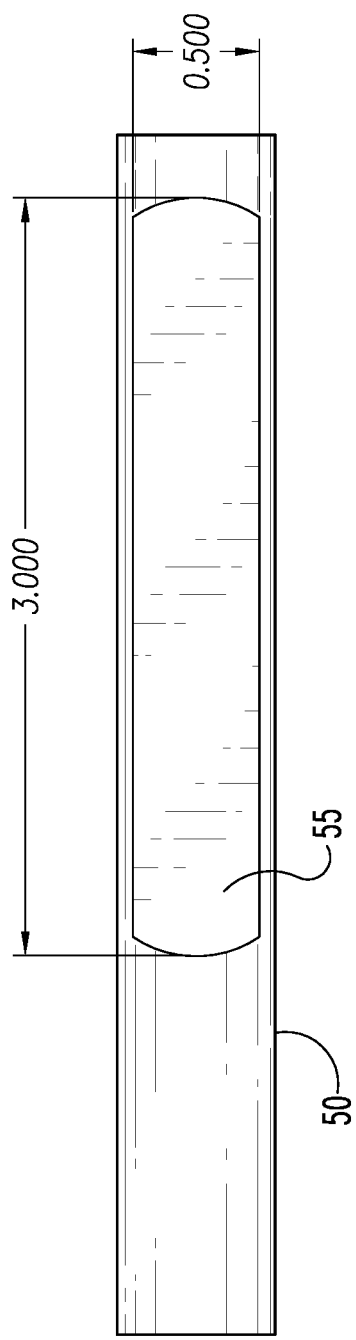

SELF-TENSIONING REEL SEAT

CROSS-REFERENCE TO RELATED APPLICATIONS

This application claims the benefit of U.S. Provisional Patent Application Ser. No. 62/341,417, filed May 25, 2016, which is hereby incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention is generally directed to quick release reel seats for use in fishing rods or poles and for attachment to bows, and is more specifically directed to self-tensioning reel seats for fishing rods and bows.

2. General Background of the Invention

Fishing reels routinely need replacement while fishing, whether due to components of the reel breaking during use or the desire to change to a different type of reel. To date, such reel change out processes remain cumbersome, in part because tools are required to implement the change out. As such, reel changing is time consuming, which takes time away from the enjoyment of the sport.

Reel changes are exacerbated when it comes to bow fishing. This is because bow fishing is a night sport, performed under low-light conditions, which hinders the ability of a fisherman to change fishing reels, given the mechanical rigors involved. As such, there is a need for a simplified and reliable reel seat, having low manufacturing costs, that permits a user to quickly change reels under low lighting conditions, while securely affixing the fishing reel within the reel seat during use. Such reel seats are an improvement over the prior art.

U.S. Pat. No. 2,114,107 to Holding generally discloses a tubular fishing reel seat having a removable thimble that can be adjusted to accommodate various reel lengths. The thimble includes an aperture for receiving a screw that is also threadably received by the tubular reel seat. The reel seat is tightened by adjustment of the screw.

U.S. Pat. No. 3,197,908 to Hirsch generally discloses a tubular fishing reel seat having a pair of foot clamp members for securing the feet of a fishing reel. One of the foot clamp members is received over a threaded portion of the tubular fishing reel seat, and can be adjusted through the actuation of a nut disposed behind the foot clamp member that is threaded onto the tubular portion of the tubular fishing reel seat.

U.S. Pat. No. 2,479,952 to Matson generally discloses a tubular fishing reel seat having two reel jaws, each of which has an opening for receiving a foot of a fishing reel. One of the reel jaws is adjustable, and includes an internal ratchet mechanism for adjusting the reel jaw. In order to move the reel jaw, a plunger must be depressed. Such depression of the plunger disengages the ratchet mechanism and allows the reel jaw to move. Once the reel jaw is manually adjusted to the desired location, to secure the reel seat, the plunger is released to permit engagement of the ratchet mechanism. The plunger, when released, further applies pressure to the ratchet mechanism in order to maintain the reel jaw at the desired location.

U.S. Patent Application Serial No. 2005/0053195 to Soderberg, which is a continuation-in-part of the application that led to U.S. Pat. No. 8,635,802, also to Soderberg, generally discloses a tubular fishing reel seat for use with a bow fishing bow. The disclosed reel seat affixes the feet of a fishing reel between a rear bushing that is longitudinally stationery on the reel seat and a cap that is forward of the reel seat's rear bushing. The cap is removable from the reel seat and is affixed to the reel seat by a threaded fastener, such as a screw, that passes through an axial borehole formed in the top region of the cap. After passing through the axial borehole, the threaded fastener is secured in a threaded bore disposed in the reel seat, so as to tighten the cap.

In view of the above background, the need remains for improved and alternative devices for the quick, cost-effective, and hassle free replacement of fishing reels in fishing poles and bows. The inventions described herein are addressed to these needs.

BRIEF SUMMARY OF THE INVENTION

In one aspect, the invention relates to a self-tensioning reel seat having an elongate body extending from a proximal end to a distal end. The elongate body is configured to support the feet of a fishing reel, and also includes a first reel seat end disposed at the distal end of the elongate body that is configured to secure at least a portion of a foot of a fishing reel. The elongate body further includes a second reel seat end disposed at the proximal end of the elongate body. The proximal reel seat end further includes a cap, where the cap is configured to secure at least a portion of a foot of a fishing reel, and is further configured to slide along the central axis of the elongate body. The proximal reel seat end further includes a tensioning medium for tensioning the cap toward the first reel seat. The self-tensioning reel seat is capable of securely seating a fishing reel between the first and second reel seat ends by way of the tensioning provided by the tensioning medium.

In another aspect, the invention relates to a self-tensioning reel seat end for a fishing reel seat that includes a reel seat end having a proximal end, a distal end, and a tensioning medium. The tensioning medium provides force between the proximal end and the distal end of the reel seat end, so as to securely seat a fishing reel in a reel seat by way of the tensioning provided by the tensioning medium.

BRIEF DESCRIPTION OF THE DRAWINGS

FIG. 2 is a side view of the inner shaft depicted in FIG. 1.

FIG. 3 is a top view of the inner shaft depicted in FIGS. 1 and 2.

DETAILED DESCRIPTION OF THE INVENTION

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

Figure 1:
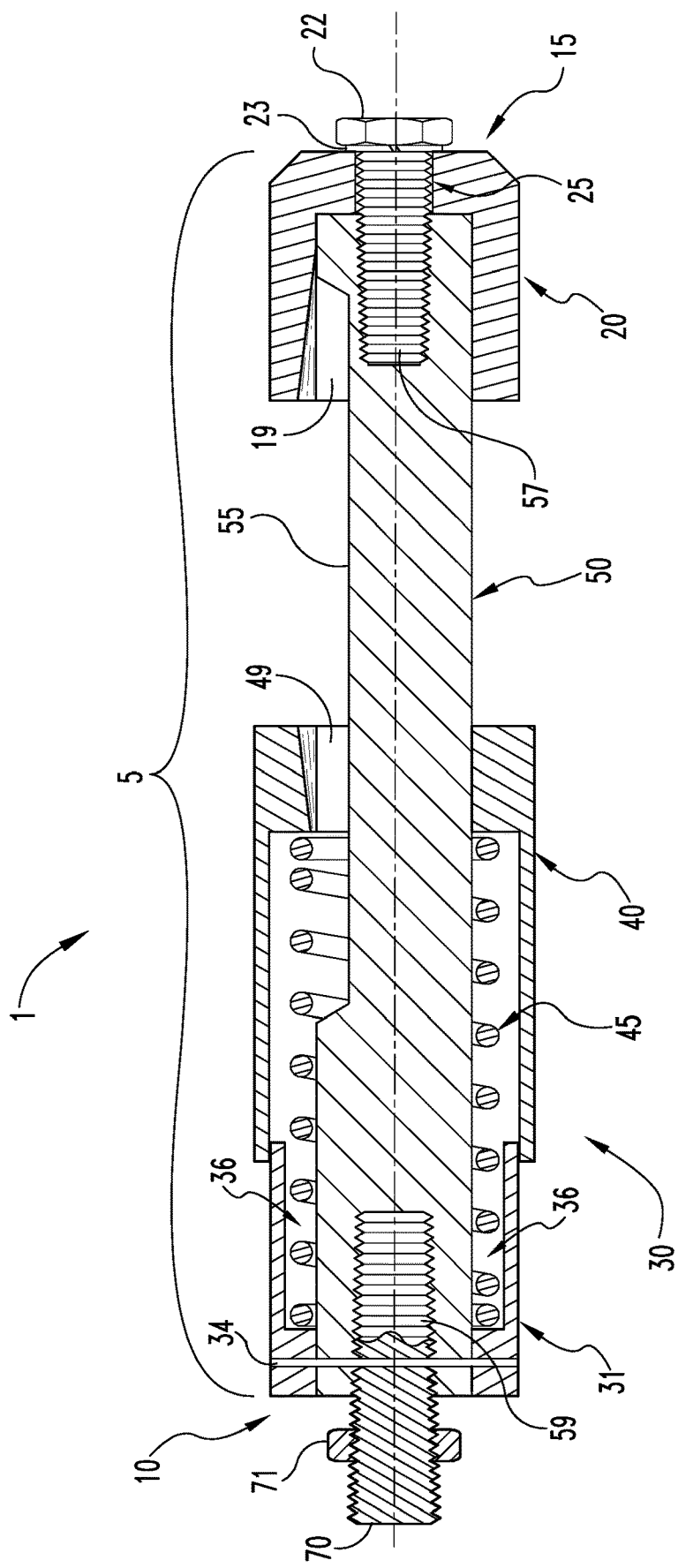
FIG. 1 is a cross-sectional view of an embodiment of the invention.

FIG. 1 illustrates an embodiment of the reel seat 1 of the invention. As shown, the depicted reel seat 1 generally includes an elongate body 5 having a proximal end 10 and a distal end 15. The distal end 15 of the elongate body 5 includes a generally cylindrical first reel seat end 20, and the proximal end 10 of the elongate body includes a generally cylindrical second reel seat end 30. Both the first and second reel seat ends are generally disposed around portions of a generally cylindrical inner shaft 50. The inner shaft includes a flat area 55 to support the feet of a fishing reel (not depicted). The inner shaft 50 also includes threaded bores 57, 59 at each of its ends.

As shown in FIGS. 2 and 3, the inner shaft 50 of the embodiment shown in FIG. 1 is approximately 4.750 inches long. Moreover, each thread bore 57, 59 is approximately 0.750 deep and consists of a 5/16-24 pitch thread that is machined into the centerline of the inner shaft 50. As depicted in FIGS. 2 and 3, the flat area 55 is approximately 3 inches in length, and starts roughly 0.250 inches from the distal end of the inner shaft. The flat area 55 is recessed into the inner shaft 50 by roughly 0.130 inches such that it occupies a width of roughly 0.500 inches. The flat area 55 can be made using an end mill or any similar technique. While the depicted embodiment shows a continuous flattened area, it is understood that the flat area need not be continuous, such as having two flat spaces that support each foot of a fishing reel. Additionally, a flat area is not necessary in all configurations, such as where the diameter of the inner shaft is sufficient to support the feet of a fishing reel or where some other method or means are employed for securing the feet of a fishing reel, such as a catch extending from the first reel seat end or cap. An alternative example of such method is where the first reel seat end 20 or the cap 40 includes means for independently securing the feet of a fishing reel, such as where the first reel seat and the cap substantially envelope a portion of each respective end of the fishing reel feet. Additionally, the aforementioned configuration and dimensions of the inner shaft 50, flat area 55, and thread bores 57, 59, can vary to suitable dimensions for making a reel seat for use with bows or with salt or fresh water fishing rods or poles. As an example, the inner shaft 50 need not be generally cylindrical in nature and can occupy any suitable shape, such as cuboidal, square prism, or triangular prism, and the like, each of which can be solid or hollow.

Returning now to FIG. 1, distal end 15 of the depicted reel seat 1 includes a first reel seat end 20. As depicted, the first reel seat end 20 is attached to the inner shaft 50 by a bolt 22 that extends into the thread bore 57 after passing through a lock washer 23 and an aperture 25 located in the head of the first reel seat end 20. In the depicted configuration of FIG. 1, the first reel seat end 20 is capable of being adjusted axially around the center line of the inner shaft 50 before securing the first reel seat end 20 in the desired location by tightening the bolt 22. In alternative embodiments, the first reel seat end 20 can be secured in non-moveable form to the inner shaft 50, such as by mechanically pressing or pinning the first reel seat end 20 onto the inner shaft 50, or by casting or forming the reel seat 1 as a solid piece, as discussed herein.

Figure 5:
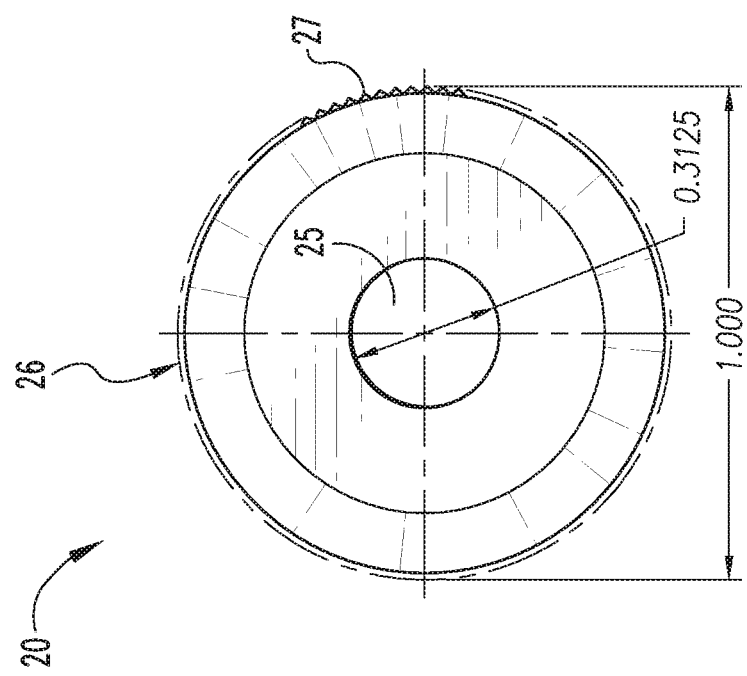
FIG. 5 is an end view of the first reel seat end depicted in FIG. 1.
Figure 4:
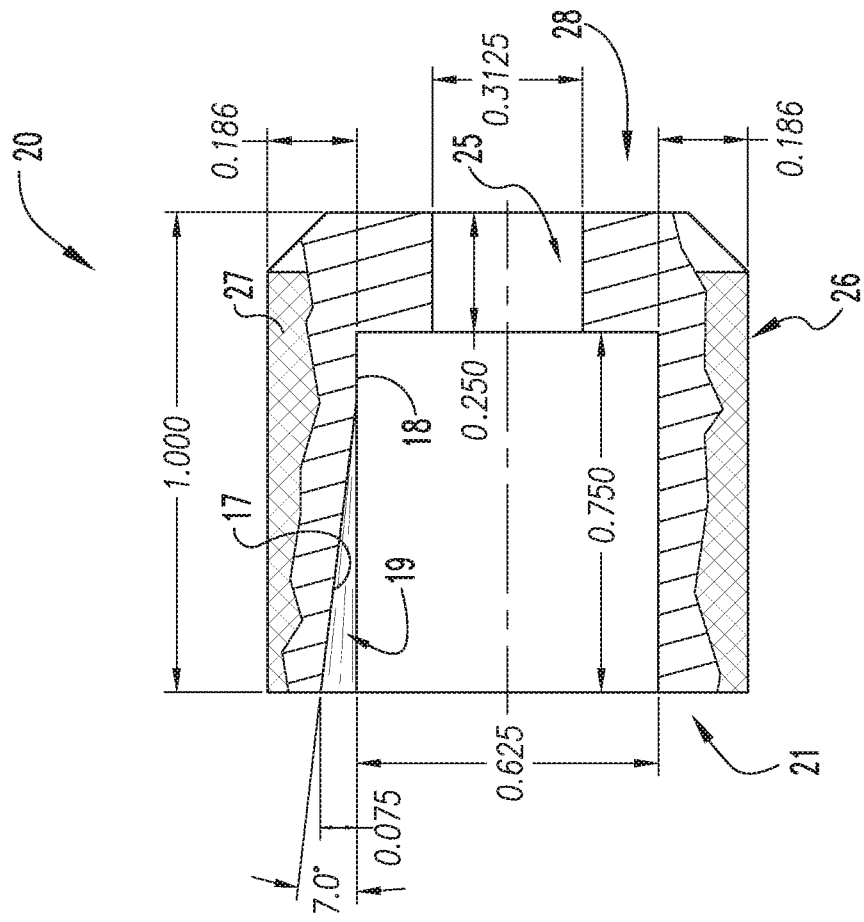
FIG. 4 is a cross-sectional view of the first reel seat end depicted in FIG. 1.

Turning now to FIGS. 4 and 5, the depicted first reel seat end 20 is generally cylindrical and has a length of approximately 1 inches and has an outer diameter of approximately 1 inch. The first reel seat end has an outer face that extends along its length. The outer face 26 of the first reel seat end 20 includes an anti-slip texture 27 that facilitates the gripping of the first reel seat end 20. Such texture can include any texturing, such as can be made through routine knurling processes that are known in the machine art. One such knurling pattern takes the form of a plurality of raised diamonds extending in an outward direction from the outer face 26 of the first reel seat end 20.

As depicted in FIGS. 4-5, the aperture 25 located in the head of the first reel seat end 20 can be 0.3125 inches in diameter; however, any suitable diameter can be used to accommodate the bolt 22 for securing the first reel seat end 20 to the inner shaft 50, such as where the size and/or pitch of the threads in the thread bore 57 vary.

As depicted in FIG. 4, the first reel seat end 20 includes a recess that extends from the proximal end 21 of the first reel seat end 20 to approximately 0.250 inches from the distal end 28 of the first reel seat end 20. The depicted recess has a diameter of 0.625 and is formed with conventional machining techniques, such as end milling or drilling. As depicted in FIG. 1, this recess receives the inner shaft 50 so as to form a recess 19 for receiving the foot of a fishing reel.

Figure 6:
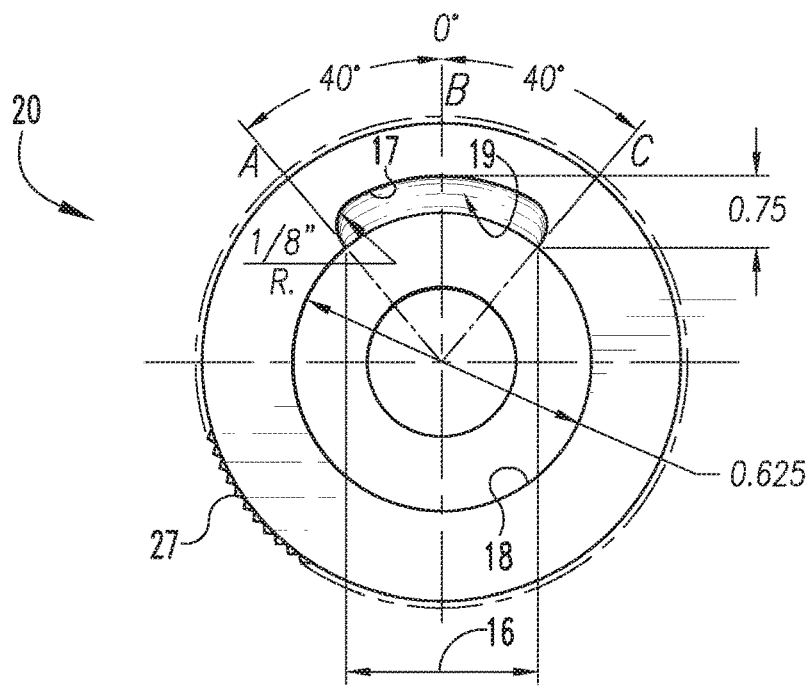
FIG. 6 is the opposite end view of end view depicted in FIG. 5.

As depicted in FIGS. 4 and 6, the first reel seat end 20 includes a recess 29 for receiving the top portion of a foot of a fishing reel. This recess 29 can be formed using an end mill, or other know methods. As depicted in FIG. 4, the recess starts at the proximal end 21 of the first reel seat end 20. The recess begins at a distance of roughly 0.075 inches from the inner surface of the wall 18 of the first reel seat end 20 and continues distally along the wall at an angle of 7 degrees as formed by the intersection of the inner wall 18 and the upper wall of the recess 17. The recess 29 can be formed using a 0.250 end mill, so as to provide the curved ⅛" radius. The recess also has a width 16 that begins at the intersection of lines A and B in FIG. 6 and ending at the intersection of lines B and C in FIG. 6. The dimensions of such recess 29 can vary, but preferably are sufficient to accommodate the foot of various reel sizes and forms. Moreover, the dimensions of such recess can be modified, with the goal being to sufficiently size the recess to work in conjunction with the flat area 55 of the inner shaft 50 to securely hold a reel foot in position once the cap 40 is tensioned against the opposing reel foot as discussed herein.

Figure 7:
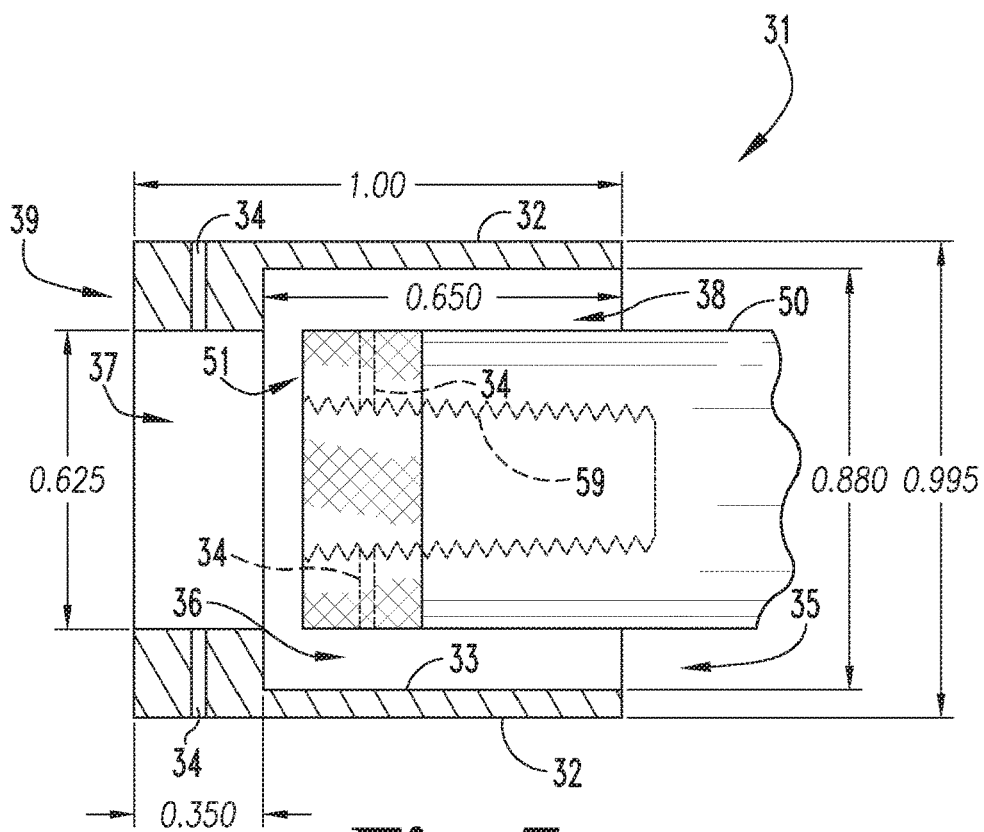
FIG. 7 is an exploded cross-sectional view of the second reel seat end depicted in FIG. 1.

FIG. 7 depicts the base 31 of the second reel seat end 30. As shown, the base is generally cylindrical and has a length of roughly 1 inch and has an outer diameter of approximately 0.995 inches that extends along the length to form an outer wall 32. The base 31 also includes a recess 38 that starts at the distal end 35 of the base 31 and extends proximally from the distal end 35 for roughly 0.650 inches. The recess 38 has a diameter of roughly 0.880 inches the forms an inner wall 33 of base 31.

The base 31 of FIG. 7, also includes a recess 37 at its proximal end 39 that extends from the proximal end 39 of the base 31 to recess 38. The proximal recess 37 receives the proximal end 51 of the inner shaft 50, which can be been knurled to facilitate the pressed joinder of the base 31 with the proximal end 51 of the inner shaft 50. After pressing the inner shaft 50 into the base 31, the threaded bore 59 can be milled into the inner shaft. In alternate embodiments, such milling can occur prior to joining the inner shaft 50 with the base 31. After pressing the inner shaft 50 into the base 31, the interface 70 for attaching the reel seat to a bow is inserted in the threaded bore 59. After such interface is placed, a set hole 34 is machined through the proximal end 39 of the base 31, the interface 70, and the inner shaft. Thereafter, a pin is pressed into the set hole 34, so as to provide another source of maintaining the joinder of the base 31, interface 70, and the inner shaft 50.

As depicted in FIG. 1, the base 31 and the inner shaft 50 form a space 36 for receiving the depicted tensioning medium 45 (a coil spring). The space should be sufficient to let the coil spring slide in and out of the space 36. Alternatively, the coil spring can be attached to the base 31 or inner shaft 50 so that it is not readily removable from the space 36, such as by threads and the like. Additionally, the reel seat of the invention can be formed with space 36, such as where the tensioning medium rests on the distal face of the base 31.

Additionally, the aforementioned configuration and dimensions of the base 31 and interface 70 can vary to provide suitable dimensions for making a reel seat for use with bows or with salt or fresh water fishing poles. For example, FIG. 1 employs a threaded interface 70 for attaching the reel seat 1 to the stabilizer bore of a bow (not depicted). Once the reel seat is sufficiently threaded into the stabilizer bore, then the jam nut 71 is tightened against the bow frame to secure the reel seat 1 in the desired rotational position. Alternatively, however, the interface 70 can include a pin that locks into a port on the bow, such as the stabilizer location, and that can be released by pulling a trigger or some similar method on the bow. Such design provides for the quick connection and release of the reel seat to the bow, and such design should include a device for positionally locking the reel seat 1 in the correct rotational configuration. Illustrative such quick release methods are further explained in U.S. Pat. No. 5,038,510 to Duke, which is hereby incorporated herein by reference in its entirety.

Figure 8:
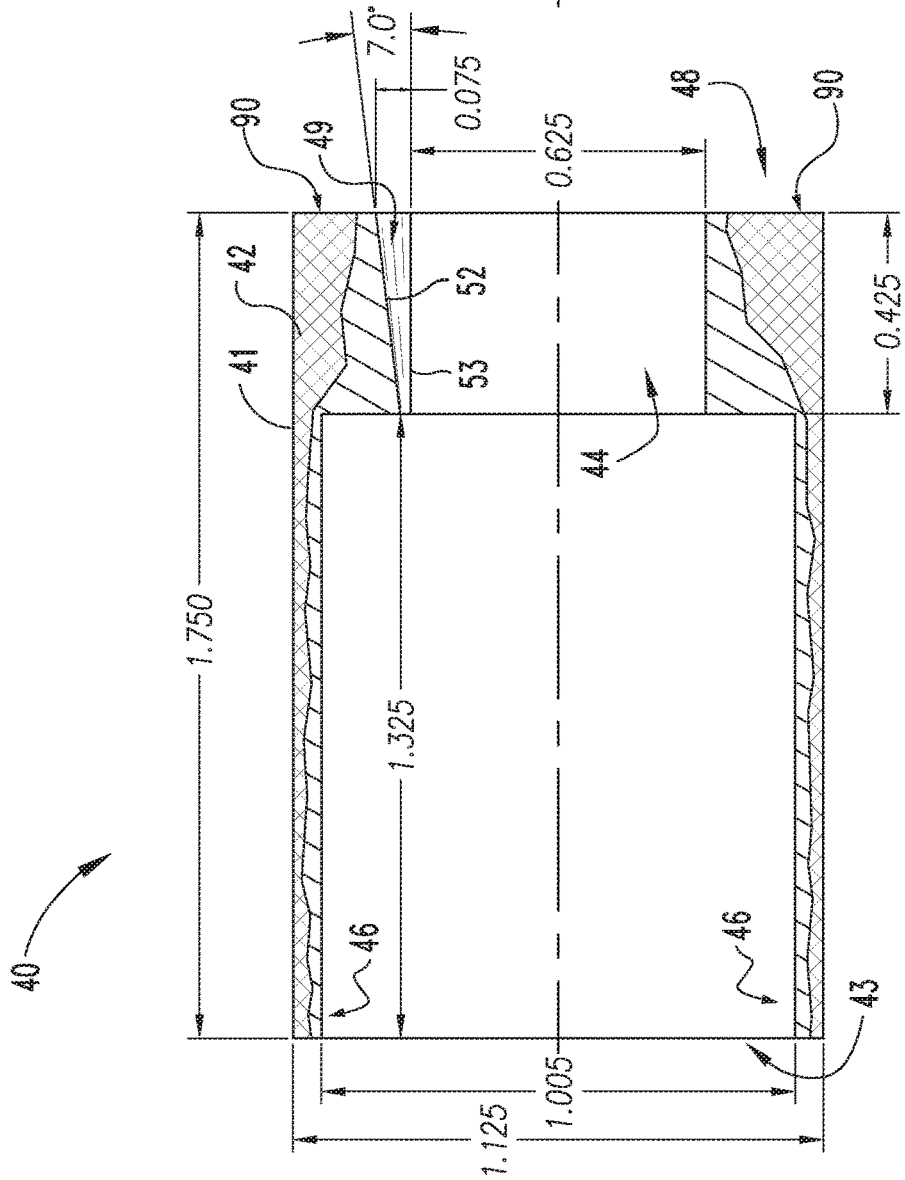
FIG. 8 is a cross-sectional view of the cap depicted in FIG. 1.

FIG. 8 depicts the cap 40 of the second reel seat end 30. As depicted, the cap 40 is generally cylindrical and has a face 90 that extends radially outward from the inner shaft 50 (FIG. 1). The depicted cap has an outer diameter of roughly 1.125 inches. The cap 40 also has an outer wall 41 that is approximately 1.750 inches long. The outer wall 41 of the cap 40 includes an anti-slip texture 42 that facilitates the gripping of the cap 40. Such texture can include any texturing, such as can be made through routine knurling processes that are known in the machine art. One such knurling pattern takes the form of a plurality of raised diamonds extending in an outward direction from the cap 40.

The cap 40 also includes a proximal recess 43 that starts at the proximal end 46 of the cap 40 and extends distally for roughly 1.325 inches. The proximal recess 43 has a relatively continuous diameter of 1.005 inches. The distal recess 44 of the cap can be formed prior to forming the recess 47 for receiving the top portion of a foot of a fishing reel. Pursuant with this embodiment, the distal recess is formed by boring a centered hole of 0.625 inches in diameter from the proximal cap recess 43 to the distal end of the cap 48. As depicted in FIG. 1, the distal recess 44 receives the inner shaft 50 so as to form a recess 49 for receiving the foot of a fishing reel.

Additionally, the aforementioned configuration and dimensions of the cap 40 can vary to provide suitable dimensions for making a reel seat for using with bows or with salt or fresh water fishing poles. For example, the diameter of the proximal recess 43 should be sufficient to enclose the tensioning medium 45 and to freely slide over the outer wall of 32 of the base 31. Additionally, the diameter of the distal recess 44 should be sufficient to permit the distal recess 44 to freely slide over the inner shaft 50.

In certain embodiments, the cap 40 can be releasably secured to the base 31 so as to conceal the tensioning medium 45. In one embodiment, the distal end 35 of the base 31 can include a lip having one or more gaps for receiving a corresponding one or more tabs located at the proximal end of the cap 40. In other embodiments, the outer wall 32 of the base 31 can include one or more J-type channels in the base 31 for received a corresponding one or more pins located at the proximal end of the cap 40 and extending inwardly into the cap's proximal recess 43. Such J-type channels should be long enough to permit the cap 40 to sufficiently slide along the inner shaft 50.

Figure 9:
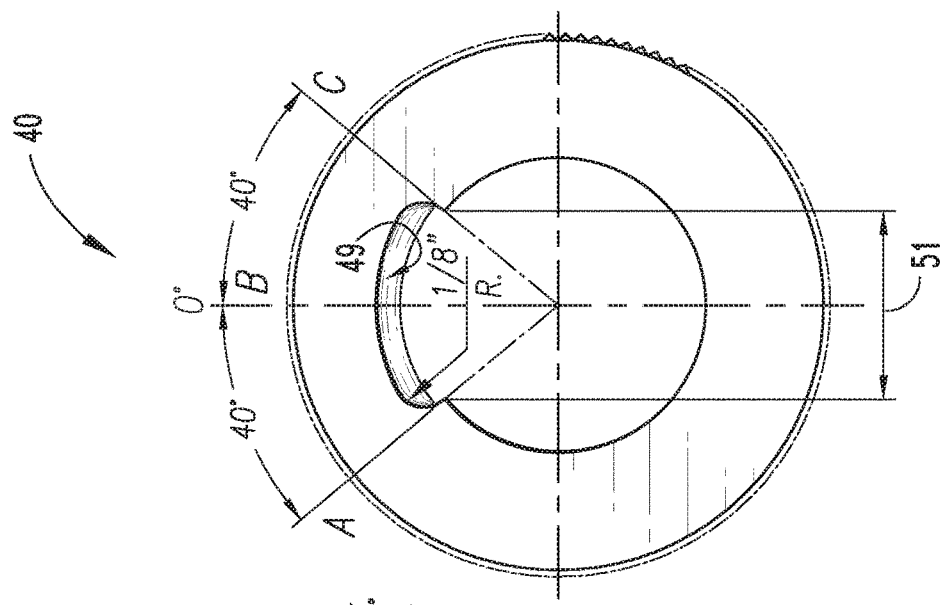
FIG. 9 is an end view of the cap depicted in FIG. 1.

As depicted in FIGS. 8 and 9, the cap 40 includes a recess 47 for receiving the top portion of a foot of a fishing reel. This recess 47 can be formed using an end mill, or other known methods. As depicted in FIG. 8, the recess starts at the distal end 48 of the cap 40. The recess begins at a distance of roughly 0.075 inches from the wall 53 of the distal recess 44 and continues proximally along that wall at an angle of 7 degrees as formed by the projected intersection of the walls 52 and 53. The recess can be formed using a 0.250 end mill, so as to provide the curved ⅛" radius. The recess also has a width 51 that begins at the intersection of lines A and B in FIG. 9 and ends at the intersection of lines B and C in FIG. 9. The dimensions of such recess 47 can vary, but preferably are sufficient to accommodate the foot of various reel sizes and forms. Moreover, the dimensions of such recess can be modified, with the goal being to sufficiently size the recess to work in conjunction with the flat area 55 of the inner shaft 50 to securely hold a reel foot in position once the cap is tensioned against the opposing reel foot as discussed herein.

As depicted in FIG. 1, a tensioning medium 45 is disposed around the inner shaft 50 between the base 31 and the cap 40. As shown, the tensioning medium 45 can include a coil spring, but in alternate embodiments, the tensioning medium can include any medium that is capable of exerting sufficient force distally along the inner shaft 50 so as to securely hold the feet of a fishing reel into recesses 49 and 19. The tensioning medium should have enough force to permit the reel seats of the invention to self-tension the fishing reel into the reel seat. Moreover, the reel seats of the invention provide for a quick release and tensioning of a reel seat so as to enable the quick replacement of a reel seat under any conditions, such as low light conditions. Additionally, the design of the reel seats of the invention does not require the manipulation of sophisticated mechanical parts during fishing reel replacement, which also provides for a quick and easy manner of replacing fishing reels. Rather, the reel seats of the invention are operated by manually manipulating the cap so as to seat or release a fishing reel in the reel seat. Once the fishing reel is seated, the cap is simply released by the user, and the reel seat automatically provides sufficient tension to securely seat the fishing reel in the reel seat.

In certain embodiments, the tensioning medium can be secured to the cap, or alternatively can replace the cap, such as where the tensioning medium is a soft polymer that will provide sufficient compression and tension to seat a fishing reel, while not creating a pinch hazard to the user. In embodiments where the tensioning medium replaces the cap, the distal end of the reel seat 1 would not require space 36, so the manufacture of the base 31 of the second reel seat end 30 could be simplified by taking the form of a stop for the tensioning medium, such as a disc or pins extending from the inner shaft 50.

Illustrative tensioning mediums can be made of any suitable materials, such as various metals and alloys, including aluminum, steel, stainless steel, and the like, as well as various polymers, such as deformable plastics, or sponge like materials. Moreover, any type of spring can be used as a tensioning medium in the invention, and can be made of an aforementioned material, such as a metal or a plastic.

The other components of the reel seat 1 discussed above can also be made of any suitable materials, such as metals and plastics. Suitable such metals include aluminum, steel, and stainless steel, and such metals may be sprayed with coatings, such as powder coatings to enhance the material properties of the metals, such as to provide corrosion resistance. Suitable such polymers includes plastics, such as ABS (acrylonitrile butadiene styrene), PET (polyethylene terephthalate), HDPE (high density polyethylene), PVC (polyvinyl chloride), LDPE (low density polyethylene), PS (polystyrene), PC (polycarbonate), and the like.

Additionally, although the reel seat of the invention may be made through various machining techniques, such as end milling, knurling, and press fitting, as discussed above, in other embodiments, other suitable techniques may be used to form the reel seat. If a metal is used to make the reel seat, such other manufacturing techniques can include the use of a casting process, such as investment casting, to cast all or a part of the reel seat components. If a polymer is used to make the reel seat, such other manufacturing techniques included extrusion and/or injection molding to make some or all of the reel seat components.

Figure 10:
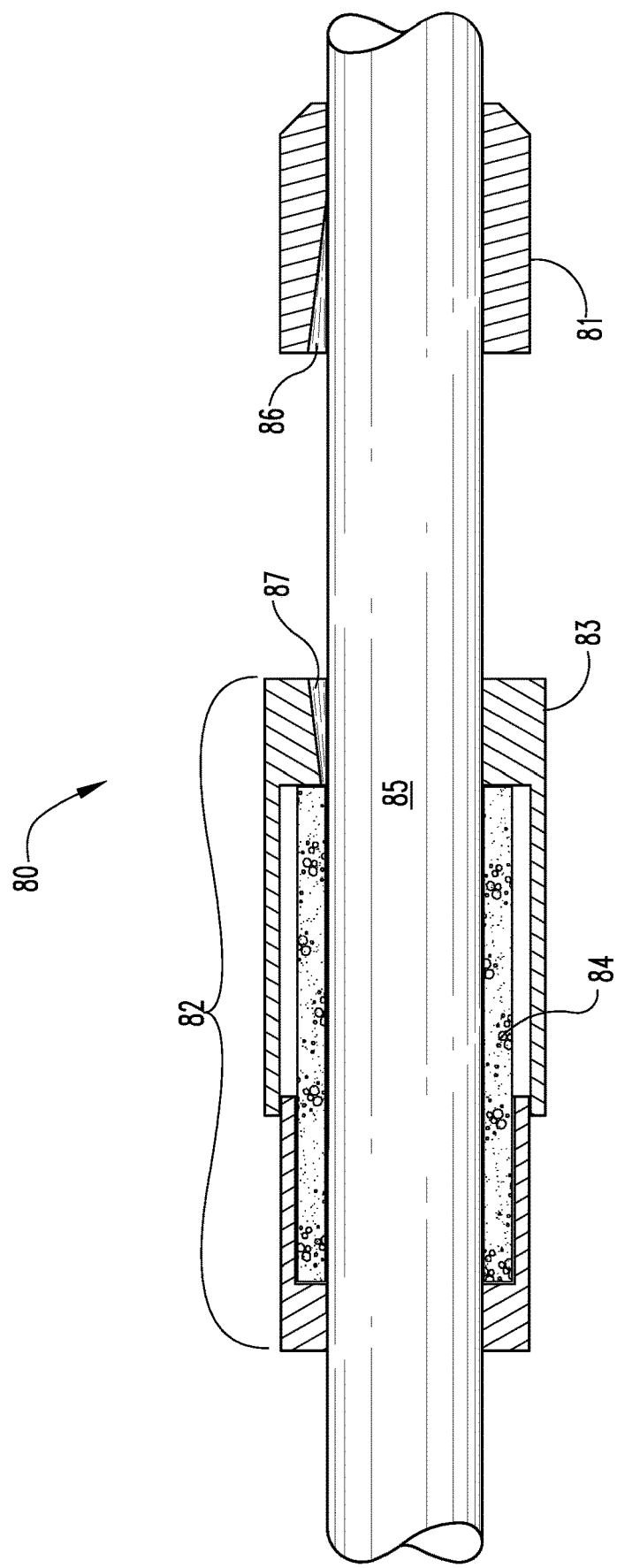
FIG. 10 is a cross-sectional view of an embodiment of the invention.

Although the reel seat of the invention can be used in bow fishing, it can also be used in pole or rod fishing, in both fresh and salt water applications. FIG. 10 depicts an embodiment of the invention used with a fishing rod or pole. As depicted, the depicted reel seat 80 has a first reel seat end 81 and a second reel seat end 82. The second reel seat end includes a cap 83, and a polymeric tensioning medium 84 disposed within the second reel seat end 82. With respect to FIG. 10, the first reel seat end 81 and the second reel seat end 82 are disposed along a fishing rod or pole 85. The reel seat ends 81, 82 are secured to the fishing rod 85 at an appropriate distance from one another so that the tensioning medium 84 can provide sufficient tension to secure a fishing reel in the reel seat 80.

With respect to FIG. 10, such reel seat ends can be secured to the fishing rod 85 by any suitable technique. Illustrative techniques include the use of a glue, such as an epoxy, to adhere the reel seat ends 81, 82 to the rod 85. Alternate techniques include the use of mechanical methods to secure the reel seat ends 81, 82 to the rod 85, such as the use of spring loaded pins in the reel seat ends 81, 82 that engage in J-channels located in the rod 85.

As depicted in FIG. 10, each of the reel seat ends 81, 82, includes a respective recess 86, 87 for receiving the top portion of a foot of a fishing reel. As illustrated, the bottom portion of such recess is formed by the body of the fishing rod 85. In an alternative embodiment, however, each recess 86, 87 can include a bottom portion that is used to support the feet of the fishing reel. In this embodiment, the recess completely envelops a portion of each foot of the fishing reel so as to provide more support to the fishing reel.

Figure 11:
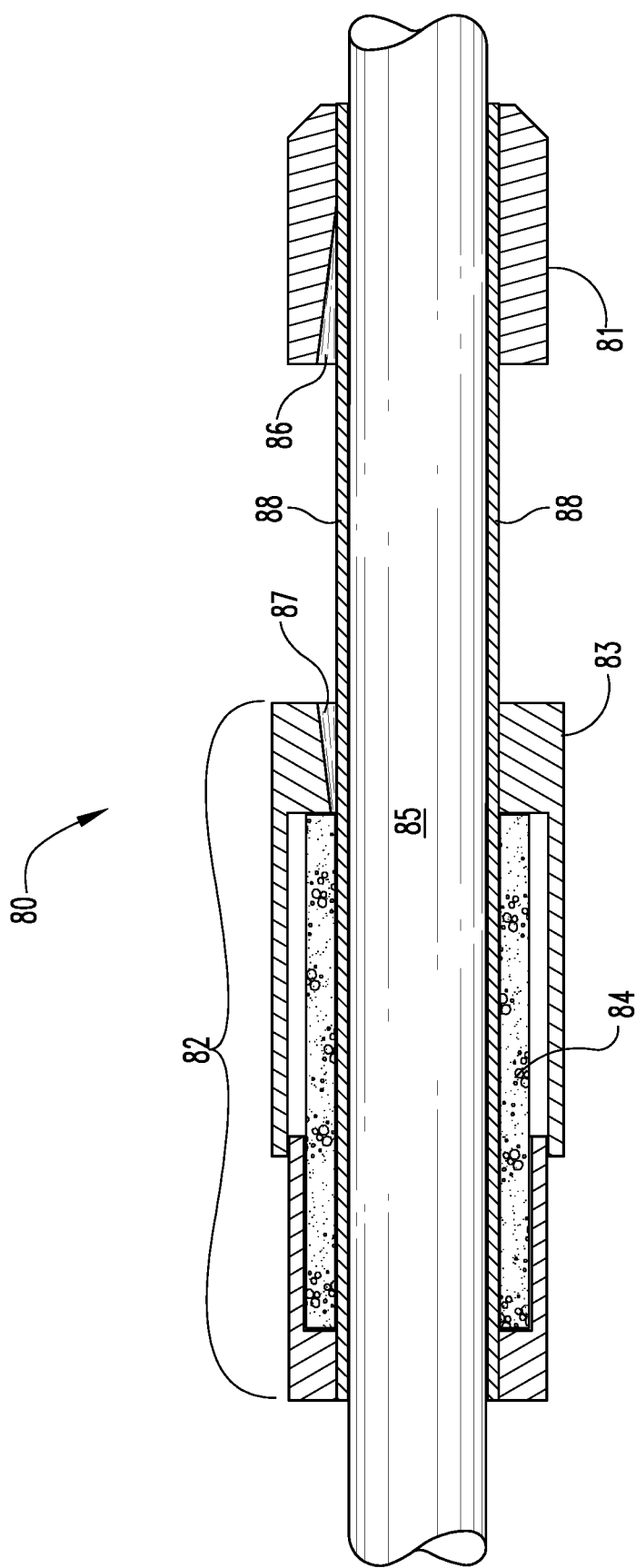
FIG. 11 is cross-sectional view of an embodiment of the invention.

FIG. 11 depicts the reel seat of FIG. 10 with the exception of the reel seat being mounted to a tube 88 that is then secured to a fishing rod. The reel seat ends 81, 82 can be mounted to the tube 88, at an appropriate distance from one another, using any suitable means, such as by gluing with an epoxy or a mechanical means discussed above. The tube can be secured to the fishing rod 88 using any suitable means discussed above. Finally, the portion or portions of the tube that will support the fishing reel can be flattened, as discussed above to provide more stable support to the feet of the fishing rod. In alternative embodiments, each end of the tube can be secured to an end of the pole or rod, such as where the rod comes in two pieces, using suitable attachment techniques known in the art. In illustrative such embodiments, the tube need not be hollow and may take the form of a shaft.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A self-tensioning reel seat, comprising:
an elongate body extending from a proximal end to a distal end, wherein said elongate body is configured to support feet of a fishing reel;
wherein said elongate body further comprises a first reel seat end disposed at said distal end of said elongate body, wherein said first reel seat end is configured to secure at least a portion of a foot of the fishing reel;
wherein said elongate body further comprises a second reel seat end disposed at said proximal end of said elongate body, wherein said second reel seat end further comprises a cap, said cap configured to secure at least a portion of a foot of the fishing reel, wherein said cap is further configured to slide along the central axis of the elongate body, and wherein said second reel seat end further comprises a tensioning medium for tensioning the cap toward the first reel seat, whereas said reel seat is capable of securely seating the fishing reel between said first and second reel seat ends by way of tensioning provided by said tensioning medium;

wherein said elongate body is configured to support the feet of the fishing reel, further comprises a flat surface capable of supporting the feet of the fishing reel;

wherein said cap further comprises a distal end disposed around an inner shaft of said elongate body, said distal end of said cap further comprising a face extending radially outward from said inner shaft of said elongate body;

wherein said cap further comprises a cylindrical body extending proximally from said distal end of said cap to a proximal end of said cap, wherein at least a portion of said cylindrical body of said cap comprises a proximal recess for receiving at least a portion of said tensioning medium;

wherein said cap further comprises a generally uniform outer diameter that extends between said proximal end of said cap and said distal end of said cap; and wherein said proximal end of said reel seat further comprises an interface for attaching said self-tensioning reel seat to a bow.

2. The self-tensioning reel seat of claim 1, wherein said first reel seat end configured to secure at least the portion of a foot of a fishing reel, further comprises said first reel seat end having a recess for receiving a top portion of the foot of the fishing reel.

3. The self-tensioning reel seat of claim 1, wherein said cap configured to secure at least the portion of a foot of a fishing reel, further comprises said cap having a recess for receiving the top portion of the foot of the fishing reel.

4. The self-tensioning reel seat of claim 1, wherein said proximal recess in said cylindrical body of said cap is further configured to receive at least a portion of a base of said second reel seat end.

5. The self-tensioning reel seat of claim 4, wherein the cylindrical body of said cap further comprises an outward face having an anti-slip texture that facilitates gripping of said cap, so as to enable compression of said tensioning medium.

6. The self-tensioning reel seat of claim 5, wherein said anti-slip texture comprises knurling.

7. The self-tensioning reel seat of claim 6, wherein said knurling comprises a plurality of diamond shapes rising outwardly from said outward face of said cylindrical body of said cap.

8. The self-tensioning reel seat of claim 1, wherein said tensioning medium comprises a material selected from the group consisting of: a metal and a polymer.

9. The self-tensioning reel seat of claim 1, wherein said tensioning medium comprises a spring.

10. The self-tensioning reel seat of claim 1, wherein said first reel seat end is releasably attached to said elongate body.

11. The self-tensioning reel seat of claim 10, wherein the removal of said first reel seat end from said elongate body provides for the removal of said cap from said elongate body.

12. A self-tensioning reel seat end for a fishing reel seat used with a bow, comprising:

a reel seat end having a proximal end, a distal end, and a tensioning medium, wherein said tensioning medium provides force between said proximal end and said distal end of said reel seat end, whereas said reel seat end is capable of securely seating a fishing reel in a reel seat by way of tensioning provided by said tensioning medium; and wherein said reel seat end further includes a cap having a generally uniform outer diameter, wherein said cap further comprises a proximal recess for receiving at least a portion of the tensioning medium and wherein said cap further comprises a distal recess for receiving a top portion of a foot of a fishing reel.

13. The self-tensioning reel seat end of claim 12, wherein said tensioning medium further comprises a coil spring.

* * * * *